United States Patent
Deu-Ngoc et al.

(10) Patent No.: US 8,817,608 B2
(45) Date of Patent: Aug. 26, 2014

(54) METHOD AND APPARATUS FOR CUSTOMIZING A FOCUS INACTIVITY TIMER BASED ON NETWORK WATERMARK CONDITIONS

(75) Inventors: Joseph Tu-Long Deu-Ngoc, Maryhill (CA); Jeremy Thompson, Waterloo (CA)

(73) Assignee: BlackBerry LimitedCA (US)

( * ) Notice: Subject to any disclaimer, the term of this patent is extended or adjusted under 35 U.S.C. 154(b) by 401 days.

(21) Appl. No.: 12/955,538

(22) Filed: Nov. 29, 2010

(65) Prior Publication Data

US 2011/0292888 A1 Dec. 1, 2011

Related U.S. Application Data

(60) Provisional application No. 61/349,967, filed on May 31, 2010.

(51) Int. Cl.
*H04W 76/06* (2009.01)

(52) U.S. Cl.
CPC .......... *H04W 76/068* (2013.01); *H04W 76/062* (2013.01)
USPC .......................................... 370/229; 370/328

(58) Field of Classification Search
CPC .. H04W 76/06; H04W 76/062; H04W 76/068
USPC .......................................... 370/229, 232, 338
See application file for complete search history.

(56) References Cited

U.S. PATENT DOCUMENTS

| | | | |
|---|---|---|---|
| 8,266,240 B2 * | 9/2012 | Marjelund et al. | 709/217 |
| 2002/0172178 A1 * | 11/2002 | Suzuki et al. | 370/338 |
| 2006/0095572 A1 | 5/2006 | Burke et al. | |
| 2008/0198871 A1 | 8/2008 | Shahidi et al. | |
| 2009/0279489 A1 | 11/2009 | Deu-Ngoc et al. | |
| 2010/0217855 A1 * | 8/2010 | Przybysz et al. | 709/223 |
| 2010/0246479 A1 | 9/2010 | Deu-Ngoc et al. | |

FOREIGN PATENT DOCUMENTS

EP 2234448 A1 9/2010

OTHER PUBLICATIONS

EP Application No. 10192929, Extended European Search Report dated Feb. 28, 2011.
Canadian Office Action for Canadian Application No. 2,739,044, dated Dec. 18, 2013.

* cited by examiner

*Primary Examiner* — Ayaz Sheikh
*Assistant Examiner* — Tarell Hampton
(74) *Attorney, Agent, or Firm* — Moffat & Co.

(57) ABSTRACT

A method and apparatus for customizing foreground application inactivity timer values based on network maximum tunnel count conditions, the method determining a maximum tunnel count value at a mobile device; and configuring at least one tunnel inactivity timer value based on the maximum tunnel count value.

14 Claims, 4 Drawing Sheets

METHOD AND APPARATUS FOR CUSTOMIZING A FOCUS INACTIVITY TIMER BASED ON NETWORK WATERMARK CONDITIONS

RELATED APPLICATIONS

The present disclosure claims priority from U.S. provisional application No. 61/349,967, filed May 31, 2010, the entire contents of which are incorporated herein by reference.

FIELD OF THE DISCLOSURE

The present disclosure relates to radio bearers for mobile devices and in particular to the assigning of radio access bearers on a mobile device.

BACKGROUND

A mobile device requires the establishment of a radio access bearer in order to communicate with the wireless network infrastructure. Furthermore, some devices allow the establishment of multiple radio access bearers for communication. In one instance, multiple radio access bearers can be dependent on the device requiring multiple packet data protocol (PDP) contexts. Thus, for example, a device may have a proprietary PDP context for the manufacturer of the device, a general wireless application protocol (WAP) context for browsing, a multi-media messaging service (MMS) PDP context for MMS applications, a streaming media PDP context for streaming media applications, among others. As will be appreciated, a PDP context is a term that is generally referred to in the third generation partnership project (3GPP) and more generally, the term "tunnel" is used herein to refer to a data connection to a particular network.

Various networks or network conditions may determine how many tunnels can be opened between a device and the network. The number of tunnels that can simultaneously be open on the device is called a "watermark".

If a watermark on the device is less than the number of tunnels that the device wishes to open, a tunnel prioritization scheme may be employed to determine which tunnels have access to the radio resources. One tunnel prioritization scheme is described with reference to FIGS. 2-4 of U.S. patent application Ser. No. 12/413,418, the contents of which are incorporated herein by reference. As described in the '418 reference, priorities can be provided based on various factors including whether or not a application or service is "in focus", meaning that the application is in the foreground. Thus, for example, if the user of the mobile device is browsing the Internet, a browser application may be displayed on the screen of the mobile device and that application may be considered to be "in focus". The WAP tunnel associated with the browser may be considered to be the focused tunnel and thus might be given the highest priority to ensure a good user experience.

In cases where the focused tunnel is idle, however, and if a limited number of tunnels are available, the reservation of resources by the focused tunnel starves other services of tunnel access.

BRIEF DESCRIPTION OF THE DRAWINGS

The present disclosure will be better understood with reference to the drawings in which.

DETAILED DESCRIPTION

Figure 1:
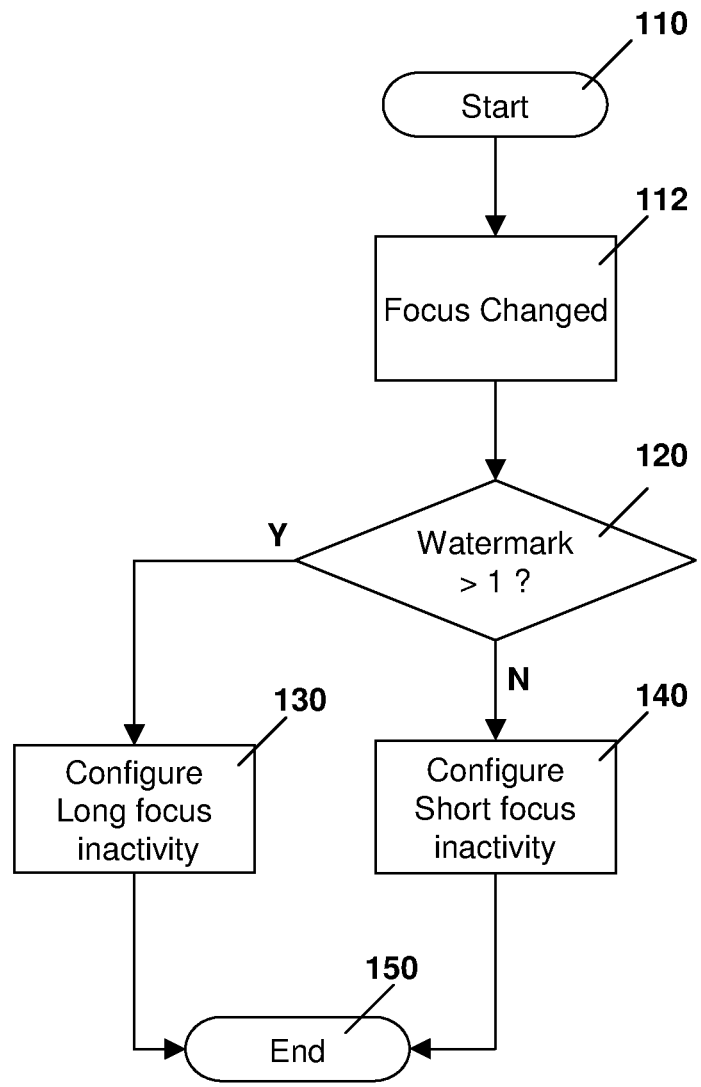
FIG. 1 is a process diagram illustrating configuration of a long or short focus inactivity timer based on a watermark value.

As used herein, the following definitions apply:
a) foreground application—refers to the application currently displayed on a display
b) background application—refers to any application that is not a foreground application;
c) tunnel—refers to a data connection for one or more applications on a particular network; for 3GPP, this is a PDP context;
d) open tunnel—refers to a tunnel that is active;
e) closed tunnel—refers to a tunnel that is not active;
f) watermark—the number of tunnels that can simultaneously be opened on a device. Also referred to as maximum tunnel count;
g) focused tunnel—this is the highest priority tunnel and by default the tunnel that is opened first. In one embodiment the focused tunnel is the tunnel used by the foreground application. An exception may occur if a device is in a device protection mode;
h) a device tunnel—this is a tunnel used for obtaining proprietary device services, such as, but not limited to, a proprietary push email service. In one embodiment it is the highest priority tunnel when there is no other focused tunnel and is the second highest priority tunnel when there is a focus tunnel. Therefore, if the watermark is greater than one, there will be one tunnel reserved for device services. The device tunnel, in one embodiment, is never the focused tunnel. Instead, the focus is simply lost, meaning there is no focused tunnel, allowing the device to regain data services;
i) a device protection mode—is a mode of operation that ensures a device tunnel is always available.

The present disclosure provides a method comprising: determining a maximum tunnel count value at a mobile device; and configuring at least one tunnel inactivity timer value based on the maximum tunnel count value.

The present disclosure further provides a mobile device comprising: a processor; and a communications subsystem, wherein the processor and communications subsystem cooperate to: determine a maximum tunnel count value at a mobile device; and configure at least one tunnel inactivity timer value based on the maximum tunnel count value.

Tunnels are used for communication between the device and a network. Each network has a certain number of tunnels that are allowed between the device and the network. The number of tunnels can range from 1 to a plurality of tunnels. For example, some networks may allow three tunnels to be active between a device and network.

In some cases, the watermark may be set to one. This means that there is only one tunnel permitted between the device and the network. In this case, the highest priority tunnel will be given access to the network. This highest priority tunnel may be considered to be the "focused tunnel". For example, if the user is browsing the Internet using a wireless application protocol (WAP) browser, the browser may be in the foreground and the tunnel for this service may be considered the focused tunnel.

If only one tunnel is permitted on the network, other tunnels that may desire access to the network are prevented from being activated. In some cases, a device may have services that require a tunnel to be established. For example, a device may be an always-on mobile device that has a push email service. The push email may be provided over a device tunnel.

However, if the WAP tunnel is active, the device tunnel will necessarily be inactive when there is a watermark of one. Thus, the device will be prevented from receiving emails over the proprietary device tunnel until focus is lost for the focused tunnel. This usually occurs when the user closes or exits the service that is utilizing the tunnel, or when the tunnel is inactive for a predetermined time based on a focus inactivity timer.

In other embodiments, the watermark may be two or more. However, due to a prioritization scheme, an tunnel may be prevented from accessing resources, even though one of the higher priority tunnels with a connection is inactive, since the higher priority tunnel is holding the network connection.

The present disclosure provides for a customizable focus inactivity timer for differing underlying network conditions. In particular, focus inactivity prevents starvation of tunnel service by defocusing tunnels that have been inactive for a certain period of time, thereby allowing other tunnels access to the network. A customizable inactivity timer allows optimized behavior to both prevent starvation in the case where the network only supports one tunnel or a limited number of tunnels, and also to minimize excessive signaling in the case where multiple tunnels are supported.

Reference is now made to FIG. 1, which shows one embodiment. The example of FIG. 1 is not meant to be limiting, and other examples of systems configured to set an inactivity time are illustrated below with reference to FIG. 3.

FIG. 1 shows a process diagram for a tunnel manager on a mobile device. As will be appreciated by those in the art, the tunnel manager serves the purpose of managing tunnel connections. Applications which require a tunnel register with the tunnel manager and the tunnel manager can then utilize prioritization algorithms to determine which tunnels are allowed to be active and which tunnels should be closed.

The process of FIG. 1 starts at block 110 and proceeds to block 112 in which a focus change occurs. As will be appreciated, since the watermark is dynamic, the timeout value is re-evaluated each time the focus inactivity timer is started or restarted.

From block 112 the process proceeds to block 120 in which a check is made to determine whether to watermark is greater than one. As will be appreciated by those in art having regard to the present disclosure, in some configurations if the watermark is greater than one then multiple tunnels may be opened, making it unlikely that an application or service is being starved of a data connection over a tunnel.

In the case where the watermark is greater than one, the process proceeds from block 120 to block 130 in which a long focus inactivity time is configured for an inactivity timer. The long focus inactivity time is a time value that is predetermined and sufficiently long to avoid excess signaling in the case of the focused service being inactive for the predetermined period in the example of FIG. 1. As will be appreciated by those in the art, in one embodiment it is desirable to prevent excess signaling and to allow longer timer values if multiple tunnels are allowed to be open on the network.

From block 120, if the watermark is not greater than one, then the process proceeds to block 140. In this case a short focus inactivity time is set for the tunnel inactivity timer. The short focus inactivity time configured for the focus inactivity timer is used to defocus the focused tunnel quickly when only one tunnel is available, therefore ensuring services are not starved while waiting for an inactive focused service to give up the data connection.

From blocks 130 or 140 the process proceeds to block 150 and ends.

As will be appreciated by those in the art, the example of FIG. 1 is merely one way of configuring the focus inactivity timer value. In alternative embodiments, the check of block 120 could check whether the watermark value equals 1, and if yes proceed to block 140. In other embodiments, the process of FIG. 1 could be performed whenever a watermark changes for a mobile device. Thus, instead of configuring the value for a focus inactivity timer when an application is registering, when the watermark changes at the device the process could be used for all currently registered applications or services to update the value of the focus inactivity timer. In the case where the watermark changes, the steps of blocks 120, 130 and 140 could still apply to each registered application or service.

Figure 2:
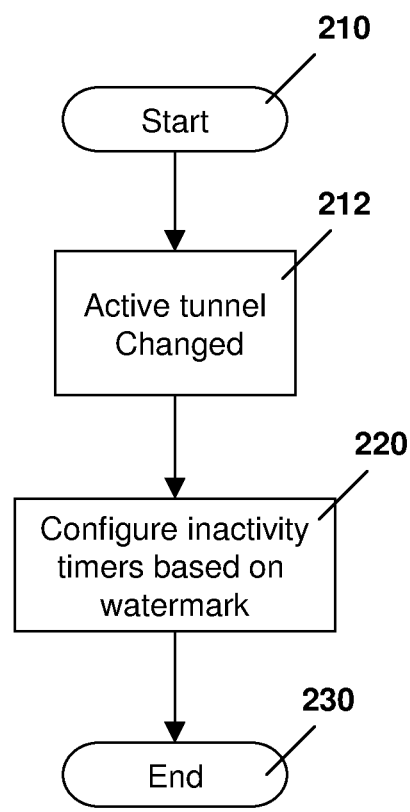
FIG. 2 is a process diagram illustrating configuration of a inactivity timer based on a watermark value.

Reference is now made to FIG. 2, which shows an alternative embodiment to that of FIG. 1. In particular, in the embodiment of FIG. 2 the values for the inactivity timers for the active tunnels are determined by the number of active tunnels permitted by the network. In other words, if only one tunnel is permitted by a network, the inactivity timer for that tunnel could utilize a first value, if two tunnels are permitted, the inactivity timers for the two tunnels could have a second value, if three tunnels are permitted, the inactivity timers for the three tunnels could have a third value, etc. In general, the expiration duration for the inactivity timer is typically inversely proportional to the number of active tunnels permitted by a network.

The value utilized for the inactivity timers could be preconfigured, provisioned to the device, or calculated dynamically by the device upon determining the watermark for the network.

The process of FIG. 2 starts at block 210 and proceeds to block 212 in which it is determined that an active tunnel has changed. For example, in a network with two active tunnels, if the second active tunnel becomes deactivated and an alternative tunnel is activated, the process will proceed from block 212 to block 220.

In block 220, the value of the inactivity timers for the active tunnels are configured based on the watermark for the network. As indicated above, the value can be configured dynamically or based on a predetermined or preset value.

The process of FIG. 2 then proceeds to block 230 and ends.

The process of FIG. 2 allows for variable inactivity timer values to be used based on the watermark of the network. Thus, for example, a shorter inactivity timer value could be used when only one network connection is allowed, whereas a slightly longer value could be used if two connections are allowed and an even longer value could be used if three connections are allowed. The configuration of the inactivity timers in accordance with FIG. 2 prevents starvation of tunnel resources for inactive tunnels while ensuring excessive signaling is prevented.

Figure 3:
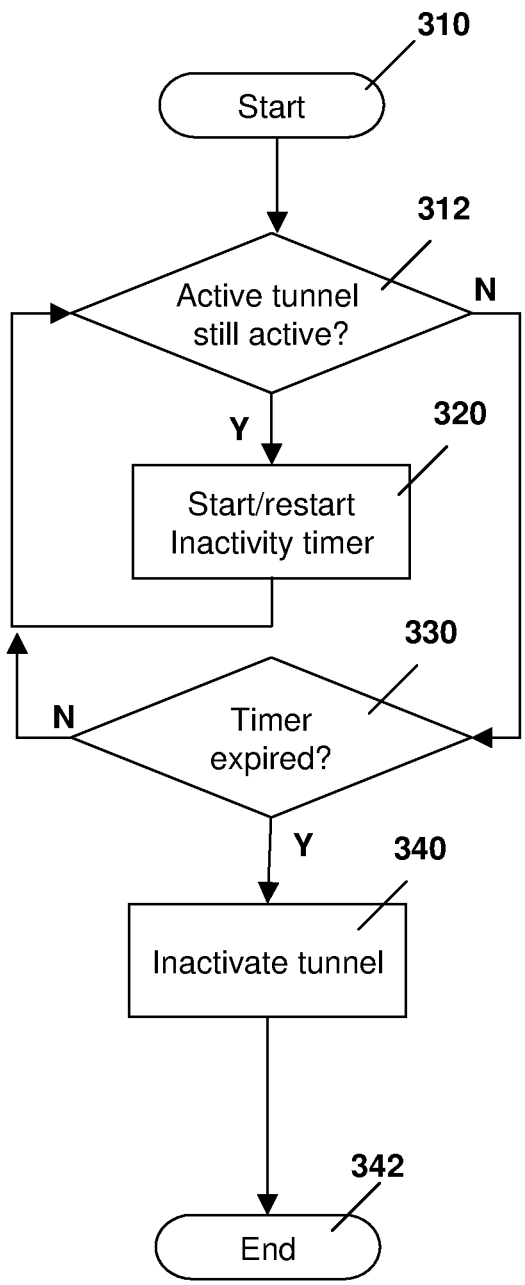
FIG. 3 is a process diagram showing the defocusing of inactive, focused tunnel.

Reference is now made to FIG. 3, which shows a process for a focused tunnel to become defocused or an active tunnel to become inactive. The process starts at block 310 and proceeds to block 312 in which a check is made to determine whether the active tunnel is still active. If yes, the process proceeds to block 320 in which the previously configured inactivity timer is started or restarted. As will be appreciated the inactivity timer may use the long focus inactivity time from block 130 or the short focus inactivity time from block 140 of FIG. 1, or may use the value configured in block 220 of FIG. 2. The maximum tunnel count, or watermark, will determine which value for the tunnel inactivity timer is used.

From block 320 the process proceeds back to block 312.

Block 320 thus continues to start or restart the timer until inactivity is detected at block 312.

If inactivity is detected in block 312, the process proceeds to block 330 in which a check is made to determine whether the tunnel inactivity timer has expired. If not, the process proceeds back to block 312.

If, in block 330, it is determined the timer has expired, the process proceeds to block 340 in which the active tunnel is deactivated. As will be appreciated by those in the art, this allows other tunnels to gain access to the network. For example, the device tunnel may gain access to the network to provide an email service. Other tunnels may also gain access and the present disclosure is not meant to be limited to any particular tunnel gaining access once an active tunnel become deactivated.

In particular, a tunnel prioritization scheme may be used to determine which tunnel is granted access once an active tunnel is deactivated. One exemplary tunnel prioritization scheme is described in U.S. patent application Ser. No. 12/413,418, the contents of which are incorporated herein by reference.

From block 340, the process proceeds to block 342 and ends.

The above therefore provides for a tunnel inactivity time that varies based on the number of active tunnels allowed for the network. This prevents the starvation of the tunnel service by focused tunnels that have been inactive for a certain period of time while preventing excessive signaling by having the focus inactivity timer expire too frequently. As will be appreciated, the excessive signaling could cause a drain of network resources and battery life on the device.

The actual values of the inactivity times may be configured by a device manufacturer, by a carrier, based on the particular service or by a user, among other options. The value can be configured at the time of device manufacture, provisioned on the device, configured by messaging or user interface on the device, or calculated on the device. The present disclosure is not meant to be limited to any particular long focus inactivity time or short focus inactivity time.

In one embodiment, the values for the tunnel inactivity times can also be configured based on the application being registered in block 112. Thus, a first application such as a browser might have a different tunnel inactivity time than a streaming service, for example. The application could thus factor into a calculation on the device for determining the inactivity time for a particular tunnel. The values for inactivity times when a plurality of tunnels are allowed on a network does not therefore need to be the same for each of the tunnels.

Figure 4:
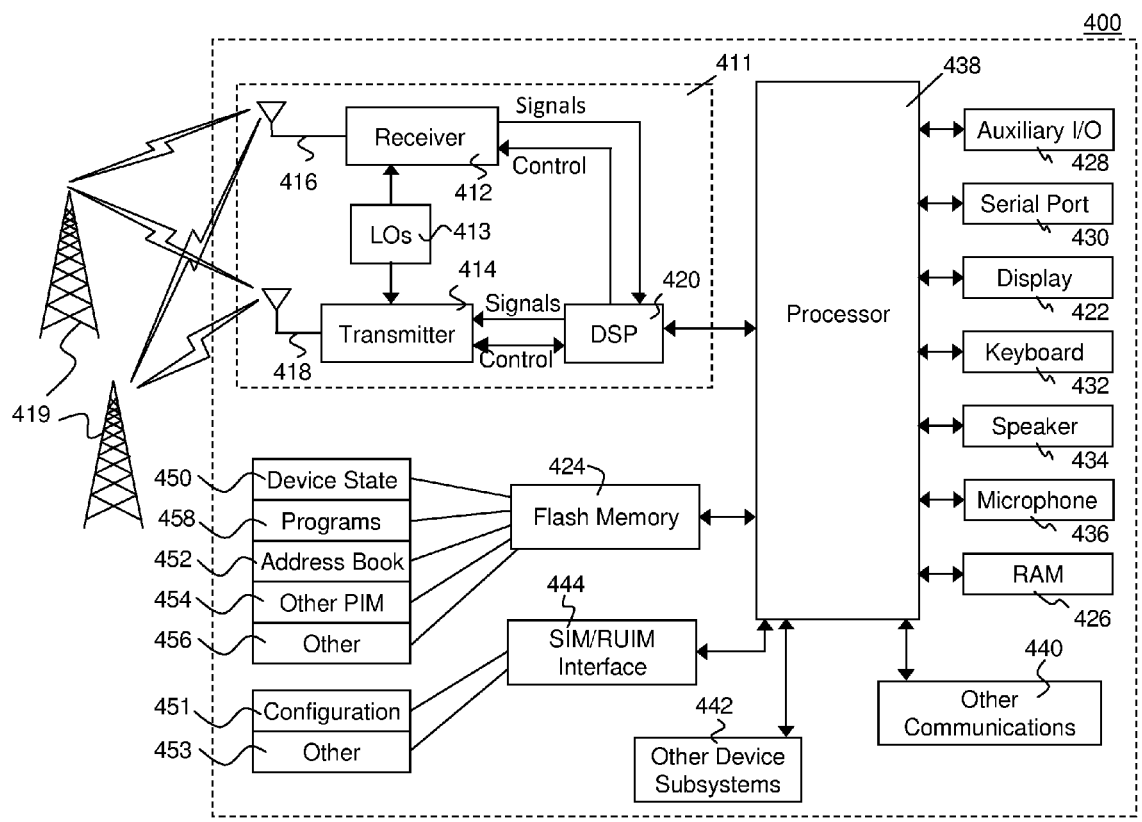
FIG. 4 is a block diagram showing an exemplary mobile device.

As will be appreciated, the configuring of the tunnel inactivity timer value, the checking of radio access bearers/tunnels and the deactivating of a focused tunnel on expiration of the tunnel inactivity timer is done utilizing the processor on a mobile device, in combination with a communications subsystem of the mobile device. One such exemplary mobile device is illustrated below with reference to FIG. 4. The mobile device of FIG. 4 is however not meant to be limiting and other mobile devices could also be used.

Mobile device 400 is typically a two-way wireless communication device having voice and data communication capabilities. Mobile device 400 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 400 is enabled for two-way communication, it will incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate.

Network access requirements will also vary depending upon the type of network 419. In some CDMA networks network access is associated with a subscriber or user of mobile device 400. A CDMA mobile device may require a removable user identity module (RUIM) or a subscriber identity module (SIM) card in order to operate on a CDMA network. In 3GPP networks, similar SIM cards may be required. The SIM/RUIM interface 444 is normally similar to a card-slot into which a SIM/RUIM card can be inserted and ejected like a diskette or PCMCIA card. The SIM/RUIM card can have memory and hold many key configuration 451, and other information 453 such as identification, and subscriber related information.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1x EVDO system, a CDMA base station and an EVDO base station communicate with the mobile station and the mobile device is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 358 and program data storage 450, 452, 454 and 456. These different storage types indicate that each program can allocate a portion of flash memory 424 for their own data storage requirements. Processor 438, in addition to its operating system functions, may enable execution of software applications on the mobile device. A predetermined set of applications that control basic operations, including at least data and voice communication applications for example, will normally be installed on mobile device 400 during manufacturing. Other applications could be installed subsequently or dynamically.

Applications and software, such as those for implements the process of FIGS. 1, 2 and 3, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 419. In one embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the processor 438, which may further process the received signal for output to the display 422, or alternatively to an auxiliary I/O device 428.

A user of mobile device 400 may also compose data items such as email messages for example, using the keyboard 432, which may be a complete alphanumeric keyboard or telephone-type keypad, among others, in conjunction with the display 422 and possibly an auxiliary I/O device 428. Such composed items may then be transmitted over a communication network through the communication subsystem 411.

For voice communications, overall operation of mobile device 400 is similar, except that received signals would typically be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

While the above examples utilize PDP contexts in 3GPP networks such as HSDPA networks, the solution is equally applicable to other networks, which include but are not limited to Universal Mobile Telecommunications System (UMTS) networks, Global System for Mobile telephony (GSM) networks, Long Term Evolution (LTE) networks, among others. For example, in UMTS, the channels are cumulative and the data must therefore be shared between the channels.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method on a mobile device, the method comprising:
   determining a maximum tunnel count value at the mobile device;

configuring a tunnel inactivity timer value based on the maximum tunnel count value, the tunnel inactivity timer value being directly proportional to the maximum tunnel count; and using the tunnel inactivity timer value for determining deactivation of a tunnel.

2. The method of claim 1, wherein the configuring utilizes values predefined values configured during manufacture, provisioned to the mobile device, or signaled to the mobile device.

3. The method of claim 1, wherein the configuring calculates values based on the maximum tunnel count.

4. The method of claim 3, wherein the calculation further varies based on an application utilizing a tunnel.

5. The method of claim 4, wherein inactivity timer values differ for each of a plurality of tunnels between the mobile device and a network.

6. The method of claim 1, wherein the configuring:
checks whether the maximum tunnel count value at the mobile device equals one, and
if yes, configure a foreground application inactivity timer with a first inactivity time; and
if no, configure the foreground application inactivity timer with a second inactivity time.

7. The method of claim 1, further comprising receiving a request to register an application with a tunnel manager prior to the determining step.

8. A mobile device comprising;
a processor; and
a communications subsystem, wherein the processor and communications subsystem cooperate to:
determine a maximum tunnel count value at the mobile device;
configure a tunnel inactivity timer value based on the maximum tunnel count value, the tunnel inactivity timer value being directly proportional to the maximum tunnel count; and
use the tunnel inactivity timer value for determining deactivation of a tunnel.

9. The mobile device of claim 8, wherein the configuring utilizes values predefined values configured during manufacture, provisioned to the mobile device, or signaled to the mobile device.

10. The mobile device of claim 8, wherein the processor and communications subsystem further cooperate to calculate values based on the maximum tunnel count.

11. The mobile device of claim 10, wherein the calculation further varies based on an application utilizing a tunnel.

12. The mobile device of claim 11, wherein inactivity timer values differ for each of a plurality of tunnels between the mobile device and a network.

13. The mobile device of claim 8, wherein the processor and communications subsystem further cooperate to, during the configuring:
check whether the maximum tunnel count value at the mobile device equals one, and
if yes, configure a foreground application inactivity timer with a first inactivity time; and
if no, configure the foreground application inactivity timer with a second inactivity time.

14. The mobile device of claim 8, wherein the processor and communications subsystem further cooperate to receive a request to register an application with a tunnel manager prior to the determining step.

* * * * *